US008037255B2

(12) United States Patent
Jeong et al.

(10) Patent No.: US 8,037,255 B2
(45) Date of Patent: Oct. 11, 2011

(54) MEMORY AND METHOD FOR DATA COMPRESSION AND MANAGEMENT

(75) Inventors: Soon-Yong Jeong, Suwon-si (KR); Chang-Woo Min, Seoul (KR)

(73) Assignee: Samsung Electronics Co., Ltd (KR)

( * ) Notice: Subject to any disclaimer, the term of this patent is extended or adjusted under 35 U.S.C. 154(b) by 930 days.

(21) Appl. No.: 11/945,079

(22) Filed: Nov. 26, 2007

(65) Prior Publication Data

US 2008/0133855 A1 Jun. 5, 2008

(30) Foreign Application Priority Data

Nov. 24, 2006 (KR) .................... 10-2006-0117006

(51) Int. Cl.
*G06F 12/00* (2006.01)
(52) U.S. Cl. ........................................... 711/154
(58) Field of Classification Search ................. None
See application file for complete search history.

(56) References Cited

U.S. PATENT DOCUMENTS

| 5,490,260 | A | * | 2/1996 | Miller et al. | .......... 711/100 |
| 5,875,454 | A | | 2/1999 | Craft et al. | |
| 6,539,460 | B2 | * | 3/2003 | Castelli et al. | ......... 711/154 |
| 6,883,079 | B1 | * | 4/2005 | Priborsky | ............. 711/170 |

FOREIGN PATENT DOCUMENTS

| KR | 1998-0010784 | 4/1998 |
| KR | 1020040107343 | 12/2004 |

* cited by examiner

*Primary Examiner* — Brian Peugh
(74) *Attorney, Agent, or Firm* — The Farrell Law Firm, P.C.

(57) ABSTRACT

A memory and a method for managing data. The memory for compressing and managing data includes a memory unit, wherein the memory unit has a compressed page cache region which includes a plurality of compressed page caches for temporarily storing, compressing and decompressing data; and a compressed page block region which includes a plurality of compressed page blocks for storing compressed data generated through the compression. Since data is stored in the memory after being compressed, it is possible to store much more data. Furthermore, as a great amount of data can be stored at one time, it is possible to minimize a lowering of the data processing speed caused by movement of data between memories.

16 Claims, 8 Drawing Sheets

```
virtual_page_entry{
    flag{
        compressor_type,    ~ 401
        lock,               ~ 403
        dirty,              ~ 405
        ...}
    data_length             ~ 407
    data_block[0]           ~ 409
} VPET[N]                   ~ 411
```

MEMORY AND METHOD FOR DATA COMPRESSION AND MANAGEMENT

PRIORITY

This application claims priority to an application filed with the Korea Intellectual Property Office on Nov. 24, 2006 and assigned Serial No. 2006-117006, the contents of which are incorporated herein by reference.

BACKGROUND OF THE INVENTION

1. Field of the Invention

The present invention generally relates to a memory, and more particularly to a memory and a method for managing data.

2. Description of the Related Art

Generally, a primary memory, such as a Random Access Memory (RAM), has advantages in that it is faster than a secondary memory, for example, a hard disk or a flash memory, and is also easier to use. However, the primary memory is more expensive than the secondary memory based on the same memory capacity.

Especially, in an embedded system, such as a mobile terminal, the larger the capacity of the primary memory is, the higher the unit price of component becomes, so price competitiveness of the mobile terminal is weak. For this reason, mobile terminal manufacturers try to manufacture a primary memory having a capacity as small as possible.

In order to solve the shortage of the capacity of the primary memory, a virtual memory scheme using swapping is mainly employed. A virtual memory scheme sets a virtual memory region in the secondary memory. According to the virtual memory scheme, data moves to the virtual memory region, and only data necessary for actual performance moves to the primary memory from the virtual memory region to be processed.

However, in the aforementioned virtual memory scheme, a period of time is spent in moving data between the primary memory and the second memory. Accordingly, frequent movement of data between the primary memory and the secondary memory causes problems of lowering data processing speed.

SUMMARY OF THE INVENTION

Accordingly, the present invention has been developed to solve the above-mentioned problem occurring in the art, and it is an aspect of the present invention to provide an apparatus and a method for minimizing the lowering of data processing speed caused by data movement between the primary memory and the secondary memory.

According to an aspect of the present invention, there is provided a method for compressing and managing data in a memory, which includes receiving and temporarily storing data, when the data is input; and compressing the data by a compression scheme to generate compressed data, and storing the compressed data.

According to another aspect of the present invention, there is provided a method for compressing and managing data in a memory, which includes searching for compressed data corresponding to data, when the data is requested to be loaded; and decompressing the compressed data by a decompression scheme to generate the data, and temporarily storing the data.

According to still another aspect of the present invention, there is provided a method for compressing and managing data in a memory, which includes searching for data, when the data is requested to be unloaded; and compressing the data by a compression scheme to generate compressed data, and storing the compressed data.

According to still another aspect of the present invention, there is provided a method for compressing and managing data in a memory, which includes searching for compressed data corresponding to data, when the data is output; and decompressing the data by a decompression scheme to generate the data, and outputting the generated data.

According to still another aspect of the present invention, there is provided a memory for compressing and managing data, which includes a memory unit with a compressed page cache region which includes a plurality of compressed page caches for temporarily storing, compressing and decompressing data; and a compressed page block region which includes a plurality of compressed page blocks for storing compressed data generated through the compression.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in reference to the accompanying drawings. The same reference numerals are used to denote the same structural elements throughout the drawings. In the following description of the present invention, descriptions of known functions and configurations are omitted to avoid making the subject matter of the present invention unclear.

The present invention relates to a primary memory, and more particularly to a method for compressing and managing data moved from a secondary memory to the primary memory. For instance, data input to the primary memory is compressed to have approximately one tenth the size of the original data through a Run-Length-Encoding (RLE) compression scheme, and the compressed data can be managed. Therefore, according to the present invention, the primary memory is able to manage much more data, not through a general swapping scheme but through a swapping-compression scheme, even with the same capacity of the primary memory. Throughout the description, the primary memory and the secondary memory are called a primary memory unit and a secondary memory unit, respectively.

Figure 1:
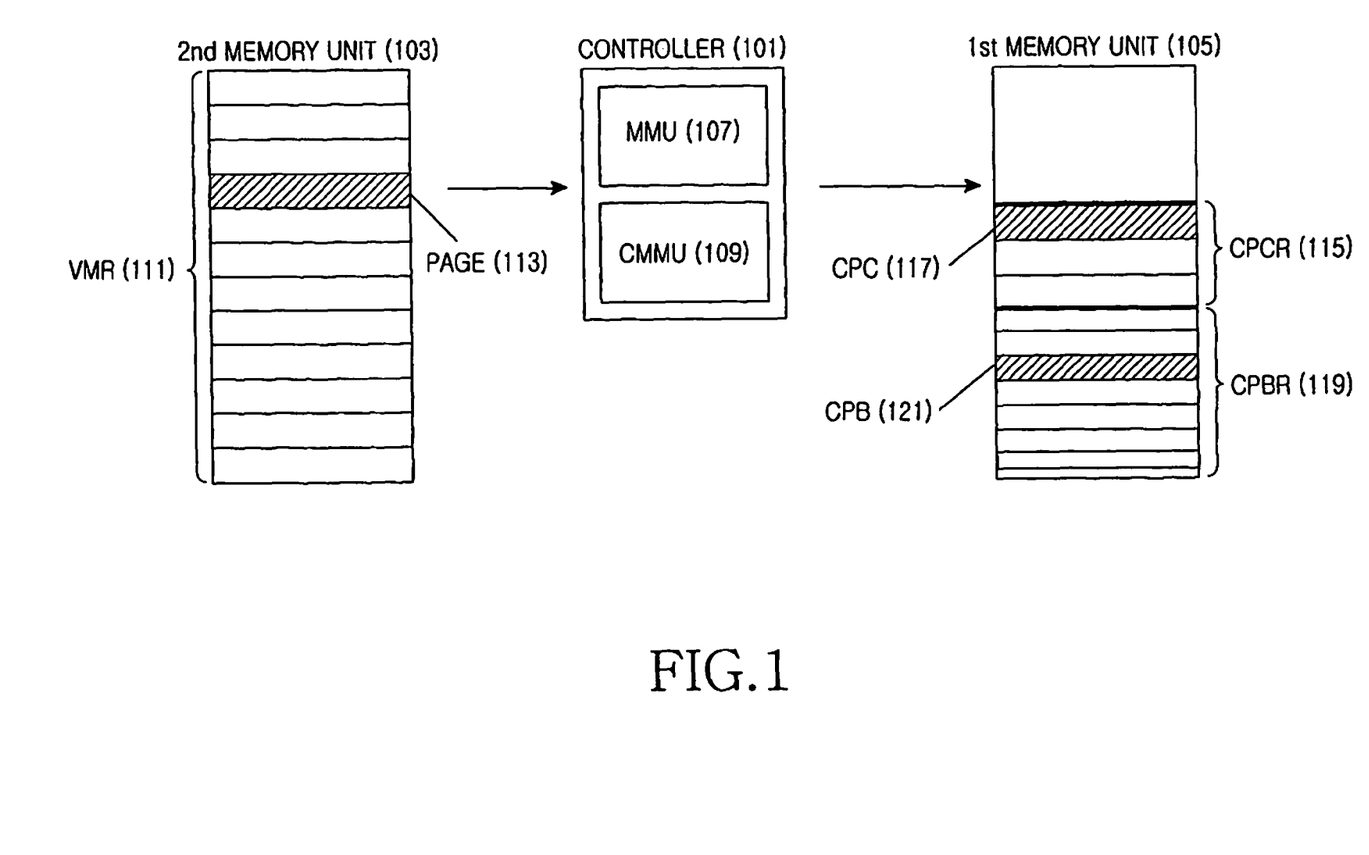
FIG. 1 is a block diagram of a terminal according to the present invention.

FIG. 1 shows a terminal according to the present invention. The terminal includes a controller 101, a secondary memory unit 103 and a primary memory unit 105.

With regard to each of the components of the terminal, the secondary memory unit 103 stores data necessary for controlling the terminal. Especially, the secondary memory unit 103 includes a Virtual Memory Region (VMR) 111, wherein the VMR 111 contains a plurality of pages 113 for storing data. The secondary memory unit 103 outputs data stored in the pages 113 to the primary memory unit 105 and receives data from the primary memory unit 105 under the control of the controller 101.

The memory capacity of the page may be randomly determined, usually, to be 4 kbytes or 1 kbyte. The total number of the pages included in the VMR 111 of the secondary memory unit 103 varies depending on the memory capacity of the VMR 111 and the memory capacity of each page. The value resulting from dividing the memory capacity of the VMR 111 by the memory capacity of one page corresponds to the total number of the pages.

For example, when the memory capacity of the VMR 111 is 32 Mbytes, and the memory capacity of one page is 4 kbytes, the total number of the pages is 8192 (32 Mbytes/4 kbytes).

In order to describe the present invention, the memory capacity of one page and the total number of the pages are denoted by P and N, respectively.

The primary memory unit 105 receives data from the secondary memory unit 103, generates compressed data by compressing the received data, and manages the compressed data, under the control of the controller 101. In particular, the primary memory unit 105 includes a Compressed Page Cache Region (CPCR) 115 and a Compressed Page Block Region (CPBR) 119.

The CPCR 115 includes a plurality of Compressed Page Caches (CPCs) 117. The CPBR 119 includes a plurality of Compressed Page Blocks (CPBs) 121.

The primary memory unit 105 receives data stored in the page 113 of the secondary memory unit 103 and temporarily stores the data in a CPC 117 included in the CPCR 115 according to the control of the controller 101.

The primary memory unit 105 compresses data temporarily stored in the CPC 117 by a compression scheme, thereby generating the compressed data. The primary memory unit 105 moves the compressed data stored in the CPC 117 to a CPB 121 included in the CPBR 119, and stores the compressed data.

The primary memory unit 105 moves the compressed data stored in the CPB 121 to a CPC 117 included in the CPCR 115, and temporarily stores the data according to the control of the controller 101. Also, the primary memory unit 105 decompresses the compressed data temporarily stored in the CPC 117 by a decompression scheme, and generates the original data. Additionally, the primary memory unit 105 outputs the original data temporarily stored in the CPC 117 to the secondary memory unit 103.

The controller 101 controls every component of the terminal in order to provide various functions of the terminal. Especially, the controller 101 according to the present invention includes a Memory Management Unit (MMC) 107 and a Compressed Memory Management Unit (CMMU) 109.

The MMU 107 of the controller 101 outputs data included in the page 113 of the secondary memory unit 103 to a CPC 117 included in the CPCR 115 of the primary memory unit 105, and temporarily stores the data in the CPC 117. The MMU 107 outputs data included in the CPC 117 of the primary memory unit 105 to the page 113 included in the VMR 111 of the secondary memory unit 103, and stores the data. Also, the MMU 107 manages a Page Table (PT) according to the memory address of the changeable CPC 117.

Figure 3:
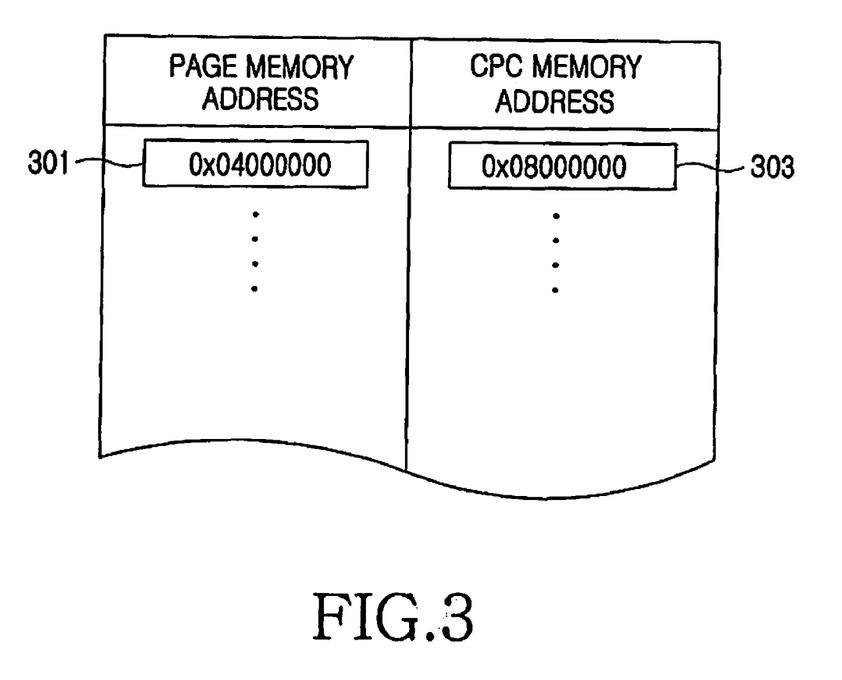
FIG. 3 is a view of a page table according to the present invention.

The PT according to the present invention will be described with reference to FIG. 3.

The PT includes a plurality of Page Entry Tables (PETs). The PETs are arrayed in a sequence of the index numbers of pages. The PET includes the memory address of a page included in the VMR 111 of the secondary memory unit 103, and also includes the memory address of the CPC 117 included in the CPCR 115 of the primary memory unit 105, where data included in the page is temporarily stored.

For example, when the memory address of an $n^{th}$ page is 0x04000000 301 and the memory address of a CPC 117 in which the data included in the $n^{th}$ page is stored is 0x08000000 303, the PET corresponding to the $n^{th}$ page may include 0x04000000 301 which is the memory address of the page and 0x08000000 303 which is the memory address of the CPC 117.

The CMMU 109 compresses data included in the CPC 117 by a compression scheme to generate the compressed data, moves the compressed data to a CPB 121 included in the CPBR 119, and stores the compressed data in the CPB 121. The CMMU 109 moves the compressed data stored in the CPB 121 to a CPC 117, and decompresses the compressed data by a decompression scheme, thereby generating the original data.

Figure 2:
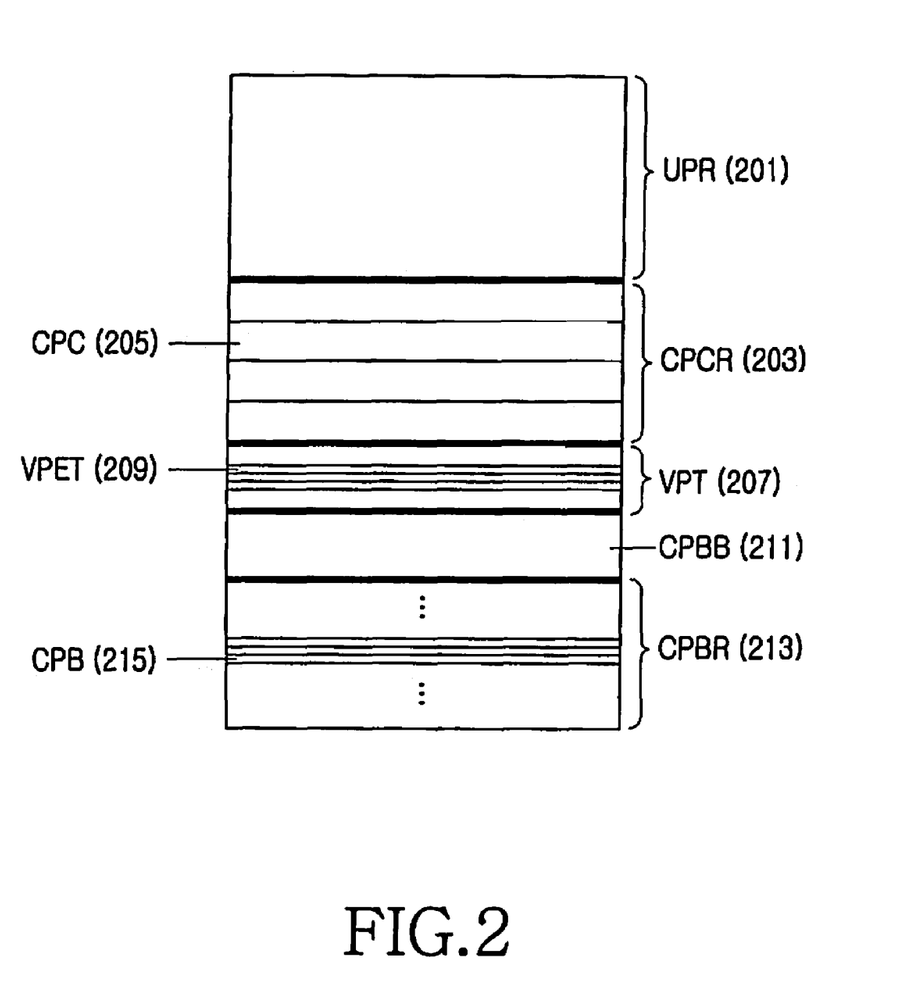
FIG. 2 is a view of a primary memory unit according to the present invention.

Up to now, the components of the terminal according to the present invention have been described with reference to FIG. 1. FIG. 2 shows a primary memory unit according to the present invention similar to the primary memory unit 105 shown in FIG. 1. The primary memory unit of FIG. 2 shows more detail than the primary memory unit 105 shown in FIG. 1 and includes an Uncompressed Page Region (UPR) 201, a Compressed Page Cache Region (CPCR) 203, a Virtual Page Table (VPT) 207, a Compressed Page Block Bitmap (CPBB) 211 and a Compressed Page Block Region (CPBR) 213. The primary memory unit 105 of FIG. 1 may be configured as the primary memory unit of FIG. 2.

The UPR 201 stores and manages a part of data output from the VMR of a secondary memory unit, through the swapping scheme, just as the primary memory unit 105 of FIG. 1 does.

The CPCR 203 includes a plurality of CPCs 205 capable of temporarily storing data. The CPCR 203 receives data from a secondary memory unit, and temporarily stores the received data in a CPC 205 according to the control of an MMU. The CPCR 203 outputs the data temporarily stored in the CPC 205 to the secondary memory unit according to the control of an MMU.

Also, the CPCR 203 compresses data stored in a CPC 205 to generate the compressed data according to the control a CMMU. Also, the CPCR 203 stores the compressed data in the CPB 215 of the CPBR 213 by moving the compressed data. Additionally, the CPCR 203 temporarily stores compressed data in the CPC 205 by moving the compressed data included in a CPB 215 according to the control of the CMMU, and decompresses the compressed data to generate the original data.

The total number of the CPCs 205 included in the CPCR 203 may be denoted by L, and the memory capacity of the CPC 205 is the same as the memory capacity of the page. Therefore, the memory capacity of the CPCR 203 corresponds to a value resulting from multiplying L, i.e., the total number of the CPCs 205, by P, i.e., the memory capacity of the CPC 205.

The CPBR 213 includes a plurality of CPBs 215 storing data. The CPBR 213 moves compressed data stored in a CPC 205 to store the compressed data in a CPB 215 according to the control of the CMMU.

Also, the CPBR 213 moves compressed data stored in a CPB 215 to temporarily store the compressed data in a CPC 205 according to the control of the CMMU.

The CPBB 211 includes the same number of bits as the number of the CPBs 215 and refers to a simple array of bits. Each bit corresponds to each CPB 215 and indicates whether the CPB 215 corresponding to each bit is available or not. For instance, when a CPB 215 has stored compressed data and is in use, the CPB 215 is not available, so the bit corresponding to the CPB 215 may have a value of 1. In contrast, when a CPB 215 is empty without storing compressed data, the CPB 215 is available, so the bit corresponding to the CPB 215 may have a value of 0.

The total number of CPBs 215 included in the CPBR 213 may be denoted by M, in which the total number of CPBs 215 must be much greater than a value resulting from multiplying an average compression ratio of data by the total number of the pages (i.e., "M").

The VPT 207 includes a plurality of Virtual Page Entry Tables (VPETs) 209.

The VPET 209 refers to a table which represents necessary information until data included in a page is stored in the CPB 215 of the primary memory unit.

Figure 4:
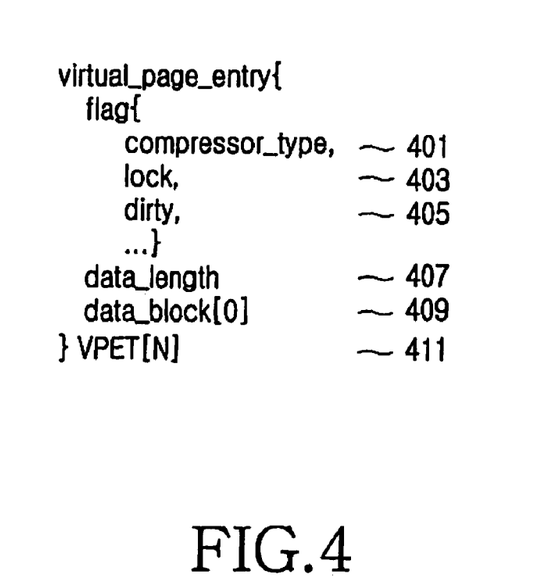
FIG. 4 is a pseudo code indicating the data structure of a virtual page entry table according to the present invention.

FIG. 4 shows the VPET 209. A compressor_type 401 represents a compression scheme which has been applied to data temporarily stored in the CPCR 203 of the primary memory unit. As the number of compression schemes for compressing data increases, the number of bits for the flag of the compressor_type 401 may increase.

For example, when only one compression scheme is used to compress data, the flag of the compressor_type 401 can be represented by 1 bit. That is, when the flag of the compressor_type 401 has a value of 1, the flag may indicate that data is compressed and stored in a CPB 215. Also, when the flag of the compressor_type 401 has a value of 0, the flag may indicate that data is stored in a CPB 215 without being compressed. After generating compressed data, when the size of the compressed data is greater than the size of the original data, it is preferred to store the original data in a CPB 215 without compressing. Therefore, it is also necessary for the flag of compressor_type 401 to have a value of 0.

A lock 403 indicates data which should not be unloaded.

A load refers to moving compressed data stored in a CPB 215 and temporarily storing the compressed data in a CPC 205 of the CPCR 203. The unload refers to moving the loaded data and again storing the data in a CPB 215 of the CPBR 213.

For instance, the flag of the lock 403 may be represented by 1 bit. In this case, when the flag of the lock 403 has a value of 0, it may represent that corresponding data can be unloaded. On the contrary, when the flag of the lock 403 has a value of 1, it may represent that corresponding data cannot be unloaded.

A dirty 405 indicates whether a write access to compressed data is to occur or not after the compressed data has been loaded on the CPBR 213. When compressed data stored in the CPBR 213 moves and is temporarily stored in the CPCR 203, the flag of the dirty 405 is initialized to 0. After the compressed data is decompressed, if the write access to the decompressed data occurs, the flag of the dirty 405 is set to 1.

A data_length 407 refers to the size of compressed data generated through compression of data.

A data_block[ ] 409 indicates a CPB 215 where data is stored after being compressed when data temporarily stored in the CPCR 203 moves and is stored in the CPBR 213. For example, when data temporarily stored in a CPC 205 is compressed and is then stored in the second and third CPBs 205 of the CPBR 213, the data_block[ ] 409 may be expressed as data_-block[2, 3].

A VPET[ ] 411 indicates the page of the secondary memory unit corresponding to the current VPET. For example, when the current VPET corresponds to the second page of the secondary memory unit, the VPET[ ] 411 may be expressed as VPET[2].

Figure 5:
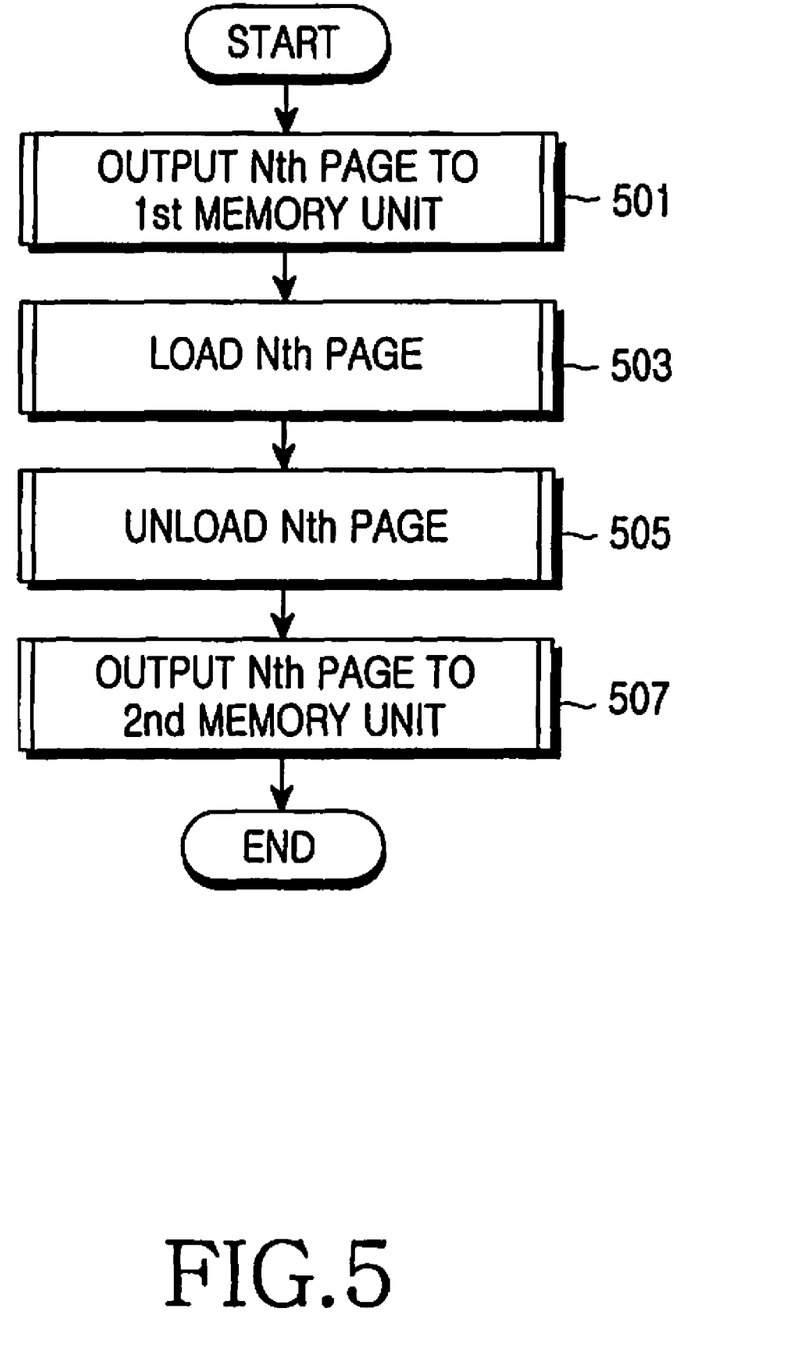
FIG. 5 is a flowchart illustrating a method for managing data according to the present invention.

FIG. 5 shows a method for managing data according to the present invention. A procedure of managing data in a terminal according to the present invention will now be described with reference to FIGS. 1 and 5.

The controller 101 outputs data stored in the secondary memory unit 103 to the primary memory unit 105 and stores the data at step 501.

Figure 6:
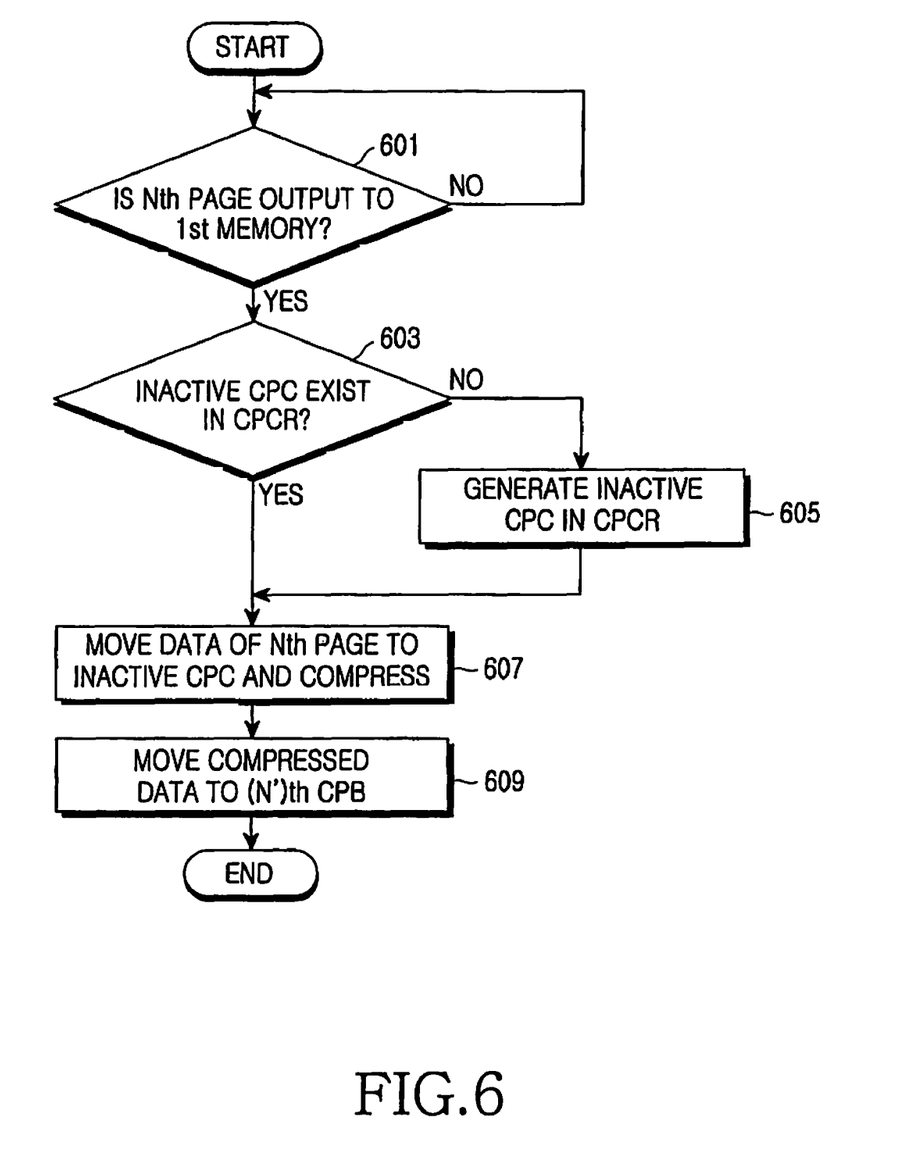
FIG. 6 is a flowchart illustrating a procedure of moving data to the primary memory unit according to the present invention.

Step 501 will now be described in more detail with reference to FIG. 6.

If a page of the secondary memory unit 103 is requested to be output to the primary memory unit 105 at step 601, the MMU 107 of the controller 101 proceeds to step 603, and if not, the MMU 107 of the controller 101 repeats step 601.

The MMU 107 of the controller 101 searches the VMR for a page index number "n" corresponding to a page at step 603. The MMU 107 outputs the searched page index number "n" to the CMMU 109.

The MMU 107 proceeds to step 607 if an inactive CPC 117 capable of temporarily storing data exists among the CPCs 117 included in the CPCR 115, and if not, it proceeds to step 605.

At step 605, the MMU 107 of the controller 101 generates an inactive CPC 117 capable of temporarily storing data, and proceeds to step 607.

For example, the MMU 107 of the controller 101 randomly selects an active CPC 117 among active CPCs 117 already temporarily storing data. Thereafter, the MMU 107 can generate an inactive CPC 117 by deleting data included in the CPC 117. As another example, the MMU 107 of the controller 101 searches for the least recently used CPC 117 among the active CPCs 117. Then, the MMU 107 can generate an inactive CPC 117 by deleting data included in the searched CPC 117.

At step 607, the MMU 107 of the controller 101 temporarily stores data included in a page to the inactive CPC 117 among the CPCR 115 included in the primary memory unit 105, thereby activating the CPC 117.

After that, the MMU 107 searches for the memory address of the activated CPC 117. The MMU 107 also searches for a PET corresponding to the page index number searched at step 603. Then, the MMU 107 analyzes the searched PET, and adds the memory address of the CPC 117 which has been searched for corresponding to the memory address of the page.

The CMMU 109 of the controller 101 compresses data included in the activated CPC 117 according to the compression scheme and generates compressed data.

At step 609, the CMMU 109 of the controller 101 searches for a CPB 121 (i.e., an $n^{th}$ block) among the CPBs 121 included in the CPBR 119. The CMMU 109 moves the compressed data temporarily stored in the CPC 117 and stores the compressed data in the searched CPB 121.

If the size of compressed data is greater than a value resulting from multiplying "C−1" by "the memory capacity of a CPB," the CMMU 109 determines that the size of the compressed data is greater than the size of the original data, and stores the original data in the CPB 121.

"C" represents a value resulting from dividing the memory capacity of the CPC 117 by the memory capacity of the CPB 121. The greater the value of "C" is, the less the memory capacity of the CPB 121 is, so the primary memory unit 105 has a higher efficiency. However, since the total number of the CPB 121 increases, there is a disadvantage in that a CPBB becomes greater (see CPBB 211 of FIG. 2).

After that, the CMMU 109 searches for a VPET corresponding to the page index number "n" and generates a plurality pieces of information included in the searched VPET (see VPET 209 of FIG. 2).

Referring again to FIG. 5, at step 503, when data included in the $n^{th}$ page is requested to be loaded, the controller 101 searches the primary memory unit 105 for a CPB 121 having stored data. Also, the controller 101 moves the compressed data included in the searched CPB 121, and temporarily stores the compressed data in a CPC 117. Then, the controller 101 decompresses the compressed data stored in the CPC 117 according to the decompression scheme and generates the original data.

Figure 7:
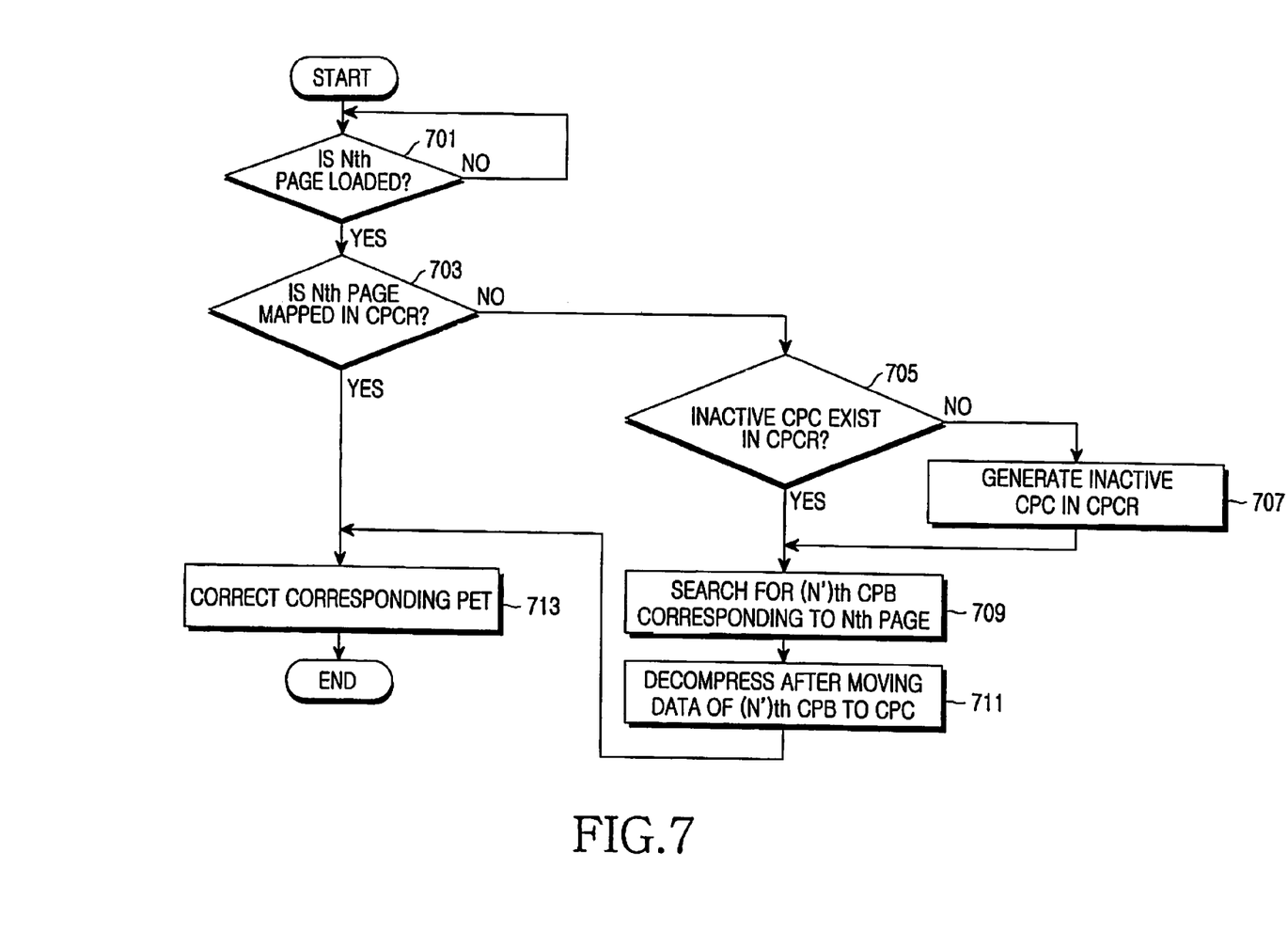
FIG. 7 is a flowchart illustrating a data loading procedure according to the present invention.

The procedure of loading data will now be described in more detail with reference to FIG. 7.

At step 701, if the $n^{th}$ page is requested to be loaded, the MMU 107 of the controller 101 proceeds to step 703, and if not, the MMU 107 of the controller 101 repeats step 701.

At step 703, if data included in the $n^{th}$ page has been mapped in the CPCR 115 of the primary memory unit 105, the MMU 107 of the controller 101 proceeds to step 713, and if not, it proceeds to step 705.

At step 705, if an inactive CPC capable of temporarily storing data exists in the CPCs 117 of the CPCR 115, the MMU 107 of the controller 101 proceeds to step 709, and if not, it proceeds to step 707.

At step 707, the MMU 107 of the controller 101 generates an inactive CPC 117 capable of temporarily storing data, and then proceeds to step 709.

At step 709, the MMU 107 of the controller 101 searches for the index number "n" of the page requested to be loaded, and outputs it to the CMMU 109. Then, the CMMU 109 of the controller 101 searches for a VPET corresponding to the input page index number (see VPET 209 of FIG. 2). In addition, the CMMU 109 searches the CPBR 119 for the $n^{th}$ CPB 121 having stored data, by using the data_block[ ] 409 among information included in the searched VPET.

At step 711, the CMMU 109 of the controller 101 activates an inactive CPC 117 by temporarily storing the compressed data of the searched $n^{th}$ CPB 121 in the inactive CPC 117. The CMMU 109 decompresses the compressed data included in the activated CPC 117 by the decompression scheme, and proceeds to step 713.

At step 713, the MMU 107 of the controller 101 searches the PETs of a PT for the PET corresponding to the page index number "n." Then, the MMU 107 changes the memory address of the CPC 117 included in the searched PET to the memory address of the CPC 117 activated at step 711.

Referring again to FIG. 5, at step 505, when data included in the $n^{th}$ page is requested to be unloaded, the controller 101 searches the CPCR 115 of the primary memory unit 105 for the CPC 117 having stored the data. Then, the controller 101 compresses the data included in the searched CPC 117 by the compression scheme, and generates the compressed data. Next, the controller 101 moves the compressed data to store in a CPB 121.

Figure 8:
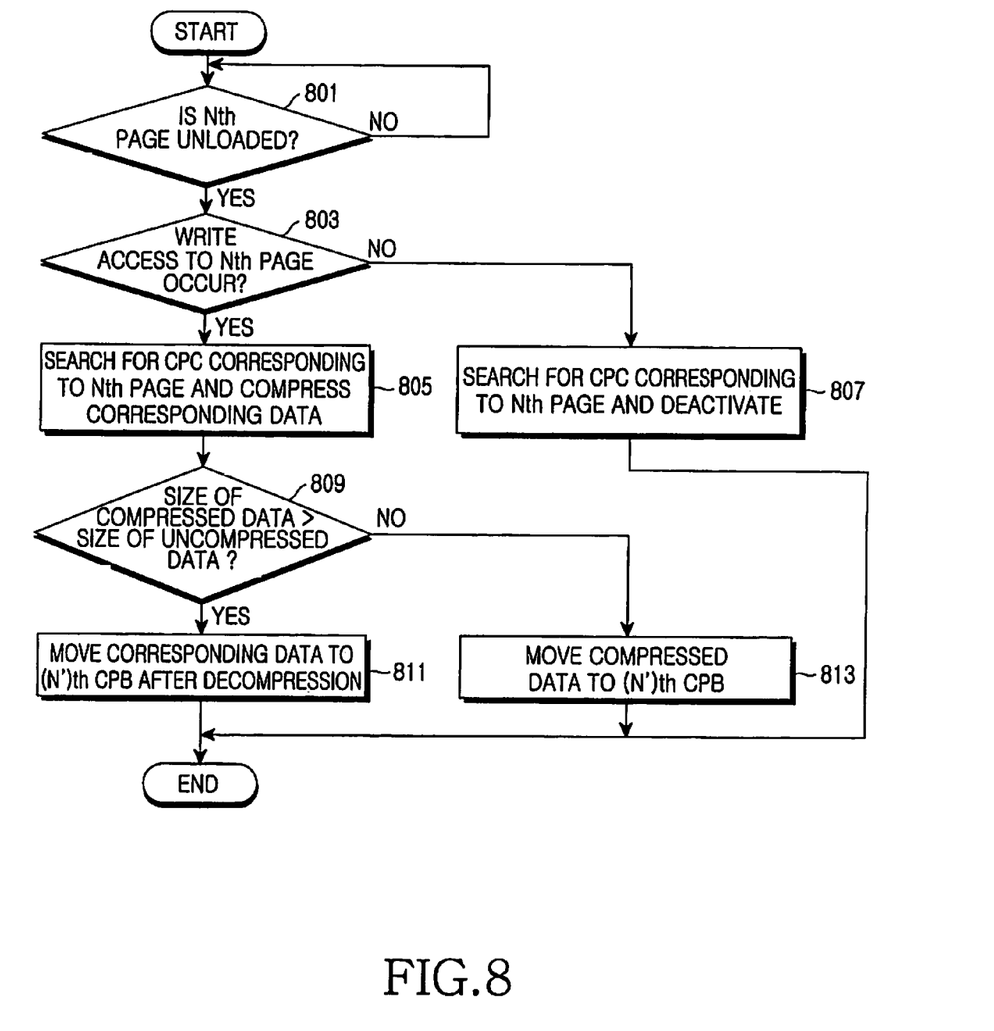
FIG. 8 is a flowchart illustrating a data unloading procedure according to the present invention.

The procedure of unloading data will now be described in more detail with reference to FIGS. 1 and 8.

At step 801, if the $n^{th}$ page is requested to be unloaded, the MMU 107 of the controller 101 proceeds to step 803, and if not, it repeats step 801.

At step 803, the MMU 107 of the controller 101 searches for the address of the $n^{th}$ page requested to be unloaded. Then, the MMU 107 searches for a PET corresponding to the address of the searched page, analyzes the searched PET, and searches for the address of a CPC 117 corresponding to the address of the $n^{th}$ page. The MMU 107 outputs the index number "n" of the page requested to be unloaded and the memory address of the CPC 117 to the CMMU 109.

At step 805, the CMMU 109 of the controller 101 searches for a VPET corresponding to the page index number "n." Then, the CMMU 109 analyzes the VPET and checks whether the flag of the dirty 405 has been set to 1 or not. If the flag of the dirty 405 has been set to 1, the CMMU 109 determines that the write access has occurred after the $n^{th}$ page is loaded, and proceeds to step 805. On the contrary, if the flag of the dirty 405 is set to 0, the CMMU 109 determines that the write access has not occurred after the $n^{th}$ page is loaded, and proceeds to step 807.

At step 807, the CMMU 109 of the controller 101 searches for a CPC 117 corresponding to the address of the CPC 117 input at step 803, deletes data included in the searched CPC 117, thereby inactivating the CPC 117.

At step 805, the CMMU 109 of the controller 101 searches for the CPC 117 corresponding to the address of the CPC 117 input at step 803, compresses the data included in the CPC 117 by the compression scheme, and generates the compressed data.

At step 809, the CMMU 109 of the controller 101 checks whether or not the size of the compressed data generated at step 805 exceeds that of the original data.

If the size of the compressed data exceeds that of the original data, the CMMU 109 proceeds to step 811, and if the size of the compressed data is equal to or less than the size of the original data, the CMMU 109 proceeds to step 813.

At step 811, the CMMU 109 decompresses the compressed data by the decompression scheme, searches the CPBs 121 of the CPBR 213 for a CPB 121, and stores the data of the CPC 117 in the searched CPB 121. Also, the CMMU 109 searches for a VPET corresponding to the page index number "n," corrects and stores a plurality pieces of information included in the searched VPET.

At step 813, the CMMU 109 searches the CPBs 121 of the CPBR 213 for a CPB 121, and stores the compressed data of the CPC 117 in the searched CPB 121.

Referring again to FIG. 5, at step 507, the controller 101 outputs the data stored in the primary memory unit 105 to the secondary memory 103 to store the data in the primary memory unit 105.

Figure 9:
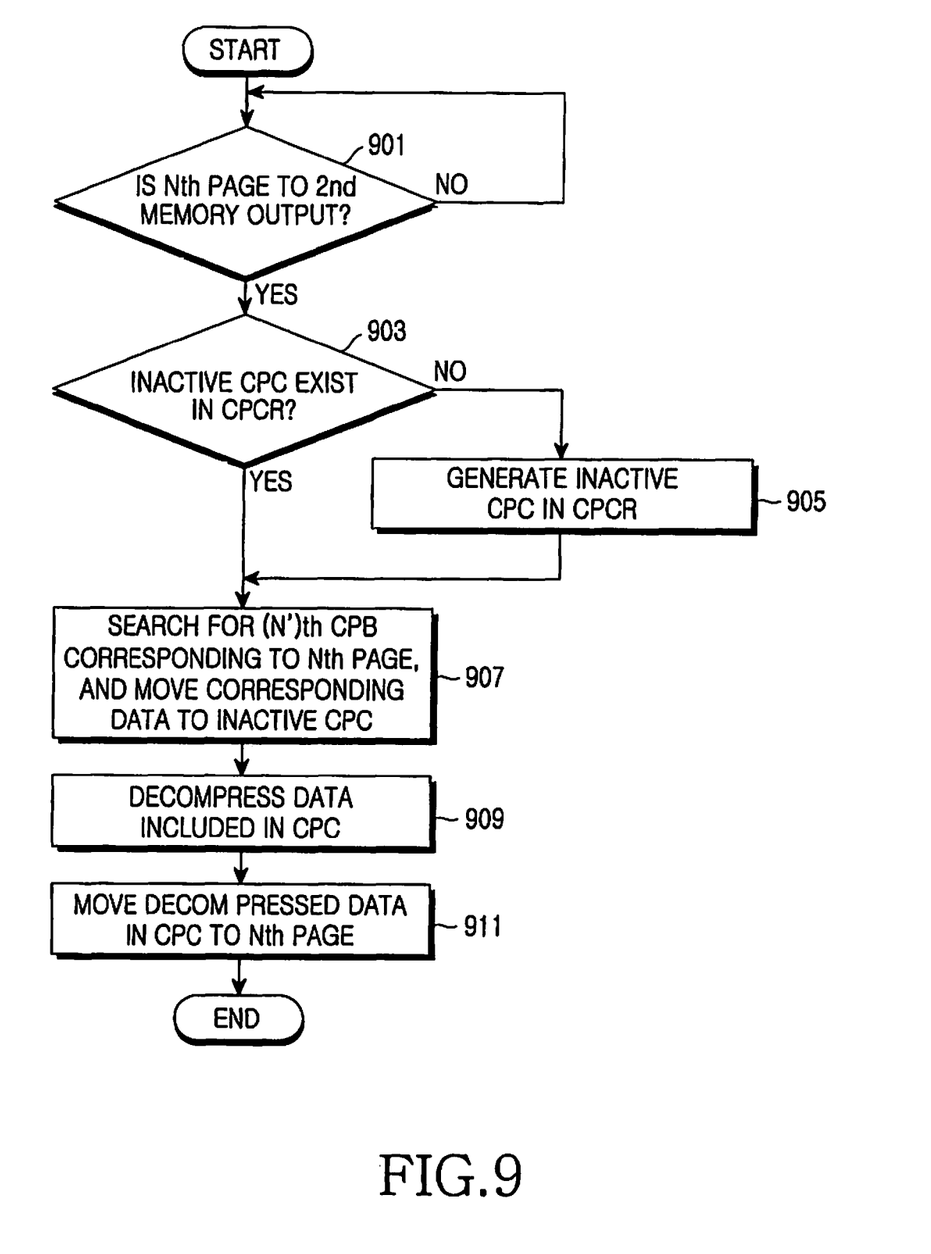
FIG. 9 is a flowchart illustrating a procedure of moving data to a secondary memory unit according to the present invention.

Step 507 will now be described in more detail with reference to FIG. 9.

At step 901, if data included in the primary memory unit 105 is requested to be stored in the secondary memory unit 103, the MMU 107 of the controller 101 proceeds to step 903, and if not, the MMU 107 repeats the step 901.

At step 903, the MMU 107 of the controller 101 searches for the index number "n" of the page in which data has been stored. Then, the MMU 107 outputs the searched page index number to the CMMU 109, and checks whether or not an inactive CPC 117 exists among a plurality of CPCs 117 included in the CPCR 115. If an inactive CPC 117 exists in the CPCR 115, the MMU 107 proceeds to step 907, and if not, it proceeds to step 905.

At step 905, the MMU 107 of the controller 101 generates an inactive CPC 117 in the CPCR 115 and proceeds to step 907.

For example, the MMU 107 of the controller 101 randomly selects an active CPC 117 from among active CPCs 117 having temporarily stored data. Thereafter, the MMU 107 can generate an inactive CPC 117 by deleting data included in the selected CPC 117. For another example, the MMU 107 of the controller 101 searches for the least recently used CPC 117 among the active CPCs 117. Then, the MMU 107 can generate an inactive CPC 117 by deleting data included in the searched CPC 117.

At step 907, the CMMU 109 of the controller 101 searches the VPETs included in the VPT for a VPET corresponding to the page index number "n" input at step 903 (see VPT 207 and VPET 209 of FIG. 2). Then, the CMMU 109 searches for the index number of a CPB 121 having stored data by using the data_block[ ] 409 included in the searched VPET, and searches the CPBs 121 included in the CPBR 119 for the CPB 121 corresponding to the searched CPB's 121 index number.

At step 909, the CMMU 109 of the controller 101 moves compressed data included in the CPB 121 searched at step 907 to the inactive CPC 117 included in the CPCR 115, and decompresses the compressed data included in the CPC 117 by the decompression scheme.

At step 911, the MMU 107 of the controller 101 searches for the PET of step 903, changes the memory address of the CPC 117 included in the PET to the memory address of the CPC 117 which has temporarily stored the compressed data at step 909, and outputs the compressed data temporarily stored in the CPC 117 to the memory address of the $n^{th}$ page included in the PET.

Through the aforementioned processes, when the primary memory unit 105 having the same memory capacity is used, the memory management method of swapping and compressing data can provide a higher efficiency for the primary memory unit 105 than the memory management method of storing data in the swapping scheme.

In addition, since the primary memory unit 105 compresses and manages data stored in the VMR 111 of the secondary memory unit 103, the secondary memory unit 103 can store much more data in the primary memory unit 105 than in the case of the swapping scheme. Accordingly, it is possible to minimize a lowering of the data processing speed caused by movements of data between the primary memory unit 105 and the secondary memory unit 103.

As described above, according to the present invention, since data input to the primary memory is compressed and then stored, it is possible to store much more data, and also it is possible to minimize a lowering of the data processing speed caused by movement of data between the primary memory unit and the secondary memory unit.

While the present invention has been shown and described with reference to certain preferred embodiments thereof, it will be understood by those skilled in the art that various changes in form and details may be made therein without departing from the spirit and scope of the invention as defined by the appended claims.

For example, while the present invention has been described about a case where data is output from a page included in the VMR 111 of the secondary memory unit 103 and is stored in the primary memory unit 105, the present invention may be realized so data is output from the secondary memory unit 103 and is then stored in the primary memory unit 105. Accordingly, the scope of the invention is not to be limited by the above embodiments but by the claims and the equivalents thereof.

What is claimed is:

1. A method for compressing and managing data in a memory, the method comprising the steps of:
   (1) transmitting data, from a secondary memory unit to a primary memory unit;
   (2) temporarily storing the data in a Compressed Page Cache Region (CPCR) of the primary memory unit; and
   (3) compressing the data by a compression scheme to generate compressed data, and storing the compressed data in a Compressed Page Block Region (CPBR) of the primary memory unit,
   wherein the primary memory unit comprises a virtual page table including a plurality of virtual page entry tables including information for compressing and decompressing data.

2. The method as claimed in claim 1, wherein step (3) comprises:
   generating the compressed data by compressing the data by the compression scheme;
   comparing a size of the compressed data with a size of the data;
   generating the data by decompressing the compressed data by a decompression scheme and storing the generated data, when the size of the compressed data exceeds the size of the data; and
   storing the compressed data when the size of the compressed data is equal to or less than the size of the data.

3. A method for compressing and managing data in a memory, the method comprising the steps of:
   searching a Compressed Page Block Region (CPBR) of a primary memory unit for compressed data corresponding to data, when the data is requested to be loaded; and
   decompressing the compressed data by a decompression scheme to generate the data, and temporarily storing the data in a Compressed Page Cache Region (CPCR) of the primary memory unit,
   wherein the primary memory unit comprises a virtual page table including a plurality of virtual page entry tables including information for compressing and decompressing data.

4. A method for compressing and managing data in a memory, the method comprising the steps of:
   (1) searching for data, in a Compressed Page Cache Region (CPCR) of the primary memory unit, when the data is requested to be unloaded; and (2) compressing the data by a compression scheme to generate compressed data, and storing the compressed data in a Compressed Page Block Region (CPBR) of the primary memory unit,
   wherein the primary memory unit comprises a virtual page table including a plurality of virtual page entry tables including information for compressing and decompressing the data.

5. The method as claimed in claim 4, wherein step (2) comprises:
   generating the compressed data by compressing the searched data by the compression scheme;
   comparing a size of the compressed data with a size of the data;
   generating the data by decompressing the compressed data by a decompression scheme when the size of the compressed data exceeds the size of the data, and storing the generated data; and
   storing the compressed data when the size of the compressed data is equal to or less than the size of the data.

6. A method for compressing and managing data in a memory, the method comprising the steps of:
  searching, by a controller in a primary memory unit, for compressed data corresponding to data, when the data is output from a secondary memory unit to the primary memory unit; and
  decompressing, by the controller, the data in the primary memory unit, by a decompression scheme to generate the data, and outputting the generated data,
  wherein the primary memory unit comprises a virtual page table including a plurality of virtual page entry tables including information for compressing and decompressing the data.

7. A memory for compressing and managing data, the memory comprising a memory unit, wherein the memory unit comprises:
  a compressed page cache region which includes a plurality of compressed page caches for temporarily storing, compressing and decompressing data;
  a compressed page block region which includes a plurality of compressed page blocks for storing compressed data generated through the compression; and
  a virtual page table which contains a plurality of virtual page entry tables including information for compressing and decompressing data.

8. The memory as claimed in claim 7, wherein the virtual page entry table comprises information representing a size of a corresponding compressed page, and an index number of a compressed page block which has stored the compressed data.

9. The memory as claimed in claim 8, further comprising a controller, which receives and temporarily stores data in a compressed page cache included in the compressed page cache region when the data is input, generates compressed data by compressing the temporarily stored data by a compression scheme, and stores the compressed data in a compressed page block included in the compressed page block region.

10. The memory as claimed in claim 9, wherein the controller generates compressed data by compressing data by the compression scheme, compares a size of the compressed data and a size of the data; generates the data by decompressing the compressed data by the decompression scheme and stores the generated data in a compressed page block included in the compressed page block region, when the size of the compressed data is greater than the size of the data; and stores the compressed data in a compressed page block included in the compressed page block region when the size of the compressed data is equal to or less than the size of the data.

11. The memory as claimed in claim 7, wherein the memory unit further comprises a compressed page block bitmap which includes at least two bits representing whether each compressed page block included in the compressed page block region has been used.

12. The memory as claimed in claim 11, wherein the controller, when data is requested to be loaded, searches the compressed page block included in the compressed page block region for compressed data corresponding to the data, temporarily stores the searched compressed data in a compressed page cache included in the compressed page cache region, decompresses the temporarily stored compressed data by the decompression scheme to generate the data, and temporarily stores the data again.

13. The memory as claimed in claim 12, wherein the controller, when data is requested to be unloaded, searches the compressed page cache included in the compressed page cache region for the data, compresses the searched data by the compression scheme to generate compressed data, and stores the compressed data in the compressed page block included in the compressed page block region.

14. The memory as claimed in claim 13, wherein the controller generates compressed data by compressing data by the compression scheme, compares a size of the compressed data and a size of the data; generates the data by decompressing the compressed data by the decompression scheme and stores the generated data in a compressed page block included in the compressed page block region, when the size of the compressed data is greater than the size of the data; and stores the compressed data in a compressed page block included in the compressed page block region when the size of the compressed data is equal to or less than the size of the data.

15. The memory as claimed in claim 11, wherein the controller, when data is requested to be loaded, searches the compressed page block included in the compressed page block region for compressed data corresponding to the data, temporarily stores the searched compressed data in a compressed page cache included in the compressed page cache region, decompresses the temporarily stored compressed data by the decompression scheme to generate the data, and temporarily stores the data again.

16. The memory as claimed in claim 15, wherein the controller, when data is output, searches the compressed page block included in the compressed page block region for compressed data corresponding to the data, temporarily stores the searched compressed data in a compressed page cache included in the compressed page cache region, decompresses the temporarily stored compressed data by the decompression scheme to generate the data, and outputs the generated data.

* * * * *